Figure 1:
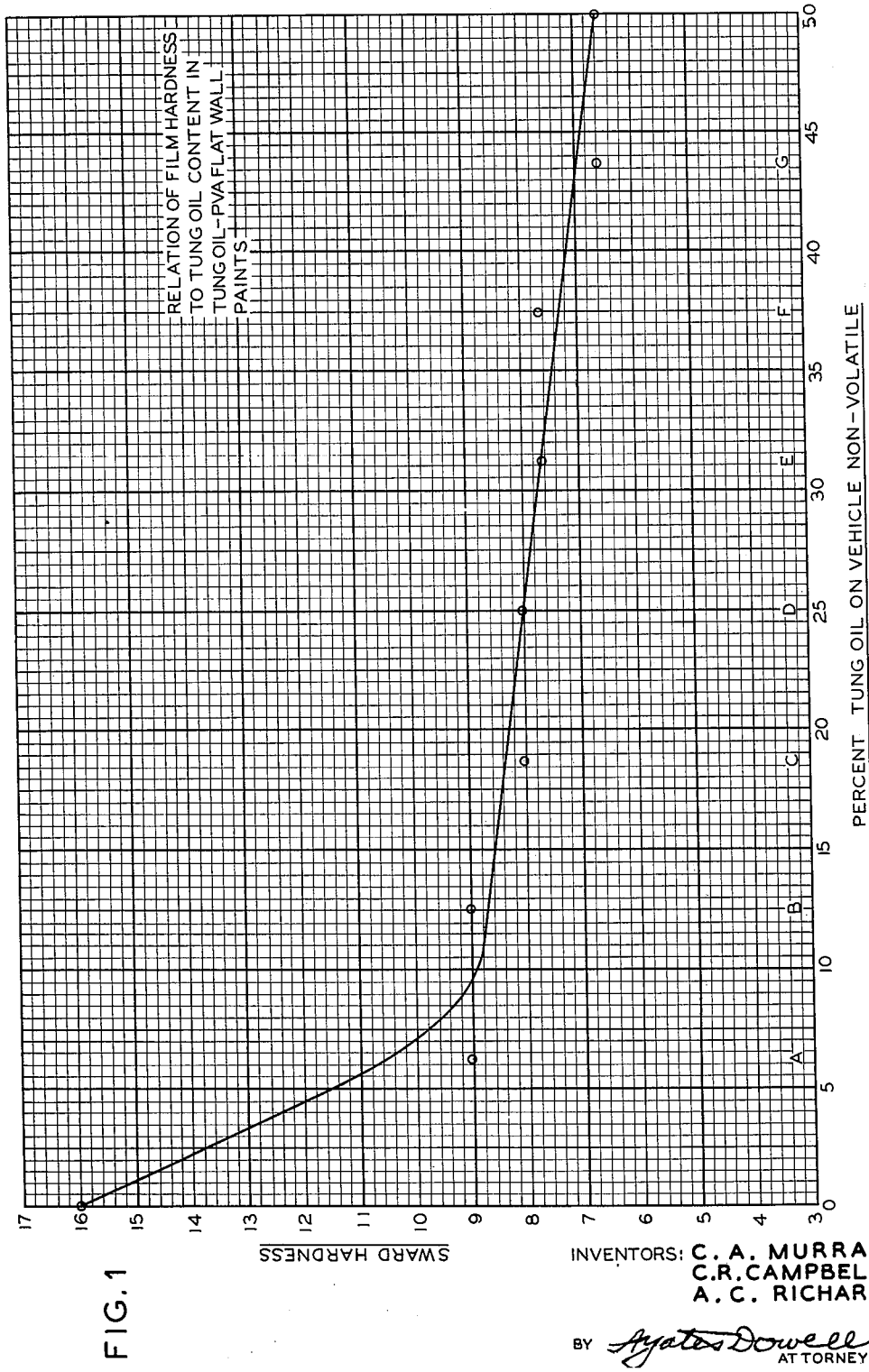
Figure 2:
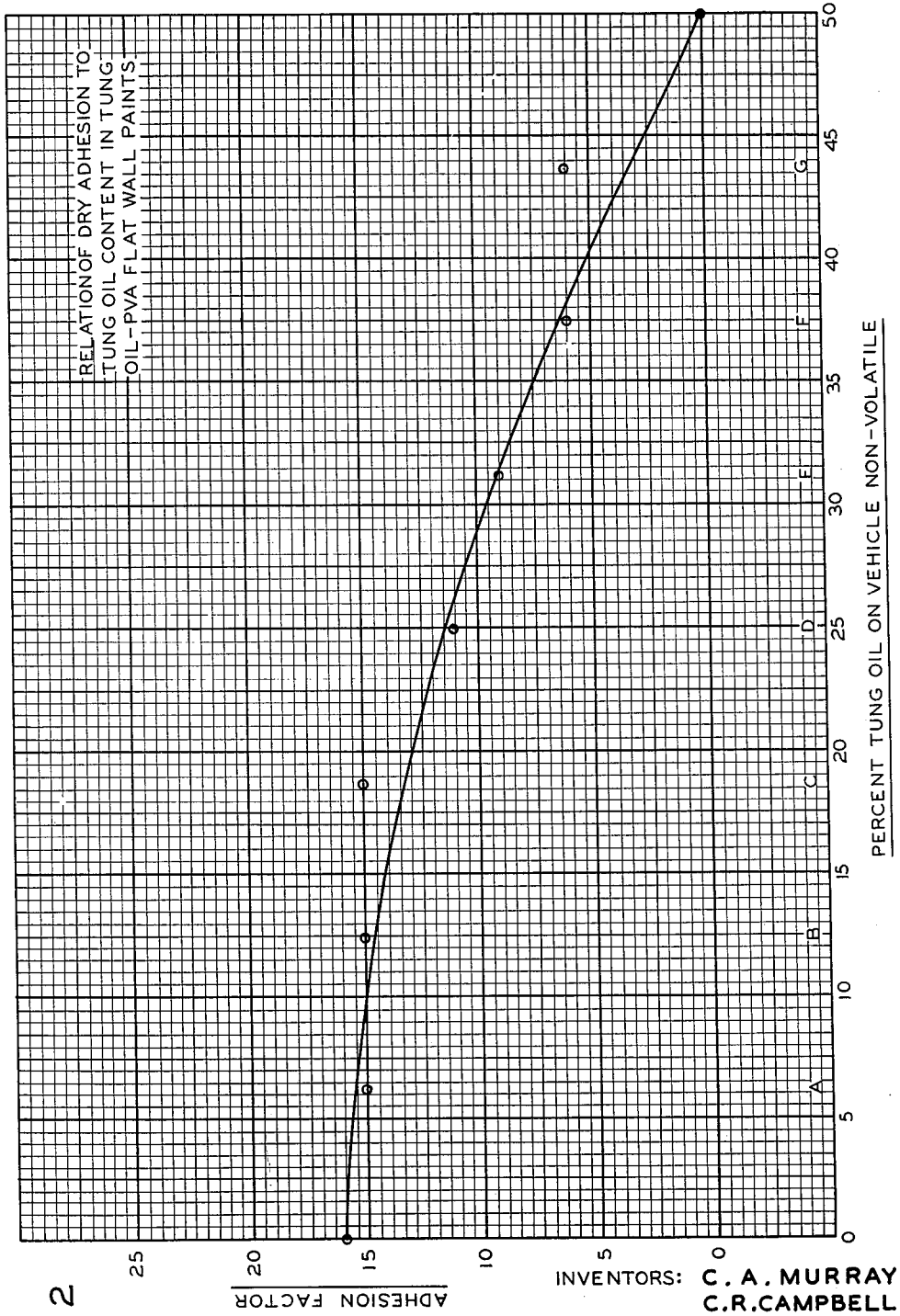

May 8, 1962 C. A. MURRAY ET AL 3,033,808
TUNG OIL-LATEX COATINGS
Filed Jan. 14, 1959 3 Sheets-Sheet 1

INVENTORS: C. A. MURRAY
C. R. CAMPBELL
A. C. RICHARD
BY Ayates Dowell.
ATTORNEY

May 8, 1962 C. A. MURRAY ET AL 3,033,808
TUNG OIL-LATEX COATINGS
Filed Jan. 14, 1959 3 Sheets-Sheet 2

INVENTORS: C. A. MURRAY
C. R. CAMPBELL
A. C. RICHARD
BY Hyatt Sowell
ATTORNEY

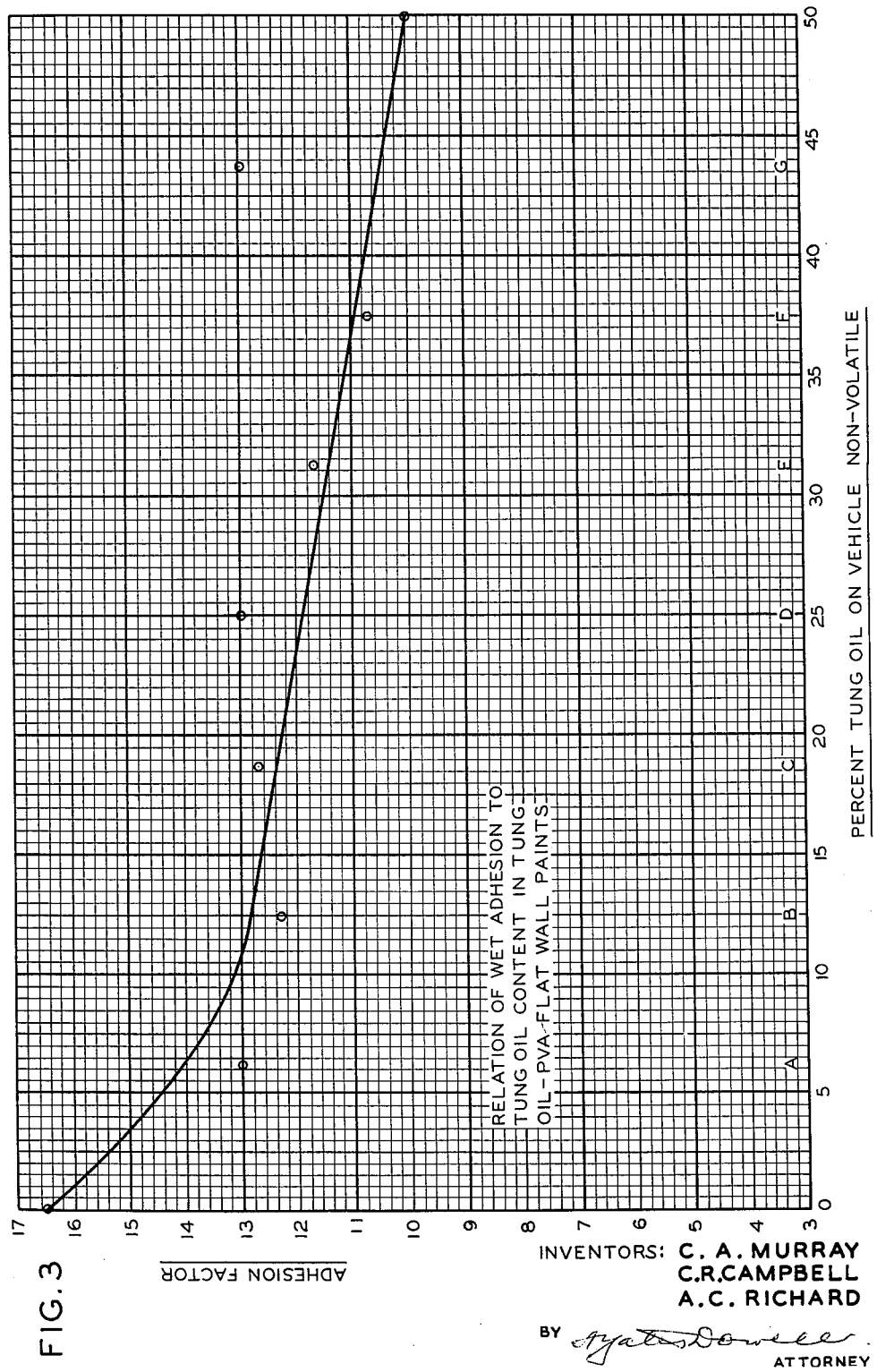

3,033,808
TUNG OIL-LATEX COATINGS
Charles Andrew Murray, Charles R. Campbell, and Allan C. Richard, all of Picayune, Miss., assignors to Crosby Forest Products Co., Picayune, Miss.
Filed Jan. 14, 1959, Ser. No. 786,858
20 Claims. (Cl. 260—23)

Synthetic "latex" type water thinned paints have been used in the past as protective and decorating coats for a number of years. By "latex" reference is made to such emulsified products as butadiene-styrene copolymer, polyvinyl acetate homopolymer and copolymer, acrylate polymer or similar polymers dispersed desirably in water. Pigmented butadiene-styrene emulsion paints stabilized with casein have been used for a number of years. These paints have been noted for the ease of application and smooth appearance when dry. It has been generally considered in the trade however that they were deficient in adhesion because they chip easily when hit and in some cases peel off in sheets from walls to which they had been applied. These paints have not generally been used on exterior wood surfaces because of adhesion difficulties.

In recent years such emulsions or water thinned paints using polyvinyl acetate (both homopolymer and copolymer) emulsions have been introduced. These paints have improved adhesion but still chip if struck with a strong blow and in some cases have been known to peel excessively. The polyvinyl acetate paints have been used extensively on exterior masonry surfaces where they have exhibited excellent color retention and durability. They have, however, in some cases failed to exhibit good adhesion and cannot be used on badly "chalked" surfaces because they do not adhere to such surfaces after drying. Also these paints cannot be used on new wood as they do not protect the wood from moisture penetration and the wood beneath the paint fails by cracking.

The acrylic emulsions have been more recently introduced to the trade but are not considered to offer improvement in adhesion over polyvinyl acetate emulsion paints as described above.

Among the objects of the present invention are included latex emulsion paints of greatly improved adhesion, particularly by utilization of tung oil especially raw tung oil.

Other objects include methods of producing such compositions and methods of applying coatings of such compositions to articles of manufacture and to the resulting coated articles.

Other and further objects and advantages will appear from the more detailed disclosure set forth below, it being understood that such more detailed description is given by way of illustration and explanation, and not by way of limitation, since various changes therein may be made by those skilled in the art without departing from the scope and spirit of the present invention.

In connection with that more detailed disclosure, the drawings show the following.

Graph I shows the relation of film hardness to tung oil content in tung oil-PVA flat wall paints.

Graph II illustrates the relation of dry adhesion to tung oil content in such paints.

Graph III illustrates the relation of wet adhesion to tung oil content in such paints.

In accordance with the present invention, it has been found that the addition of tung oil greatly improves the adhesion of latex emulsion paints to the surfaces of articles particularly having wood surfaces or articles of masonry, and also otherwise improves such compositions and the resulting coatings.

The tung oil utilized is desirably raw tung oil since it is found in these compositions that the latter has a greater effect in improving the adhesion than does bodied tung oil or tung oil modified resins such as alkyd resins.

The latex emulsion paints may be any of the conventional latex paints, but desirably are pigmented synthetic latex aqueous emulsion paints. While such latices may be natural or synthetic, such as butadiene-styrene emulsions, and acrylic emulsions, and their equivalents, for example, and the tung oil component may be added to such available conventional latex paints, it is better to use polyvinyl acetate as the latex component and instead of merely adding the tung oil component to the conventional latex paint, the best results are obtained by replacing a portion of the latex in the conventional latex paint formula by an equal amount of the tung oil component, the latter desirably being incorporated in an emulsified form, the emulsion desirably including metallic driers and an emulsifying agent.

While various types of emulsifying agents may be used, preferably the emulsifying agent is non-ionic as illustrated by the "Tergitols" marketed by Union Carbide & Chemicals Corp., such as "Tergitol" NPX, the "Tergitols" being any of the higher sodium alkyl sulfates and possessing wetting and emulsifying properties. The driers may be any of those available on the market for such purposes such as lead naphthenate or cobalt naphthenates, or mixtures. But other emulsifying agents and driers may be employed. Thus "Advawet" marketed by Advance Solvent and Chemical Corp. which is a synthetic non-ionic surface active agent may be employed, and are of the type of polyhydric alcohol esters of high molecular weight mineral organic acids. The latter types of wetting agents are particularly useful for wetting pigments to assist in their dispersion in the paint or analogous compositions.

The pigments employed may be any of them used in the art in such latex paints, and the following are illustrative.

Titanium dioxide is used as the principal hiding pigment to give high opacity to the paint. Calcium carbonate, silica, and clay are used for their rheological properties to give easy brushing, uniform sheen, resistance to burnishing and good levelling.

Rutile titanium dioxide pigment is used, available in similar grades from several manufacturers. Finely divided calcium carbonate used is known by the trade name "Snowflake Whiting" manufactured by Thompson-Weinman Co. Similar grade by other manufacturers could be used satisfactorily. Silica known by the trade name "Goldbond R" manufactured by Tamms Industries is used. Clay known as "Iceberg Clay" manufactured by Burgess Pigment Co. is used. These pigments may be admixed with dispersing agents such as "Advawet" referred to above, or anti-foaming agents such as "Foamicide," marketed by Colloids of Virginia, or any other common adjuvants or additives may be employed. Various other adjuvants in such compositions may be included such as anti-freezing components for example ethylene glycol, and assistants for levelling and coalescence in paint such as the Cellosolves and their esters, like butyl Cellosolve acetate. Thickening agents such as "Cellocize WP-4400" (hydroxyethyl cellulose) and ethyl cellulose, etc. may be utilized in conventional manner.

As the latex, polyvinylacetate is preferably employed in aqueous emulsion. The addition of tung oil to polyvinyl acetate paints greatly increases adhesion and flexibility of the paint. Exemplary emulsion procedure will be illustrated below.

With the tung oil modified latex, paint adhesion is improved so that the paint does not chip when struck and does not peel in sheets from surfaces. When used in exterior masonry latex paints, it becomes possible to paint badly chalked masonry surfaces without subsequent peeling. These tung oil modified latex emulsion paints may also be used on new wood protecting it from weather without cracking.

A general method of procedure for paint formulation according to the present invention is as follows.

To make the tung oil modified latex paint of this invention it is preferred to use a conventional paint formulation, and to add the desired amount of emulsifiable tung oil desirably omitting the same amount of latex resin solids but adjusting the formula to the same proportion by addition of water. In the present process a high speed mixing machine is used, first adding the desired amount of water to the mixing vessel. Then add dispersing and stabilizing agents and immediately add the emulsifiable tung oil in the initial step of the manufacturing procedure. Powdered pigments are then added to the mixing vessel and high speed agitation continued until a smooth paste is obtained. The paste is then pumped through a high speed stone mill used for paint grinding to assure thorough dispersion of the pigments. To the finely ground paint paste in a mixing vessel then is added latex emulsion and agents used for improving the application of the paint and protecting it against freezing. The paint is then adjusted to the desired solids content by addition of water and is then ready for use.

Thus the invention is directed to adding tung oil to a water base paint, particularly one containing polyvinylacetate, some of the polyvinyl acetate being replaced by the tung oil in desirably equal amounts, to obtain improved adhesion, easy washability and scrubbability. In exterior water base paints, better adhesion is secured even on old "chalking" surfaces (such as concrete block and the like), even when the latter have been coated with one or more coats of conventional cement paint. Considerably better results are obtained by the compositions of the present invention on exposed wooden panels, particularly southern yellow pine. Various examples illustrating the effect of varying proportions are given below. In general, particularly satisfactory results are obtained by using from 10 to 40% by weight of emulsified tung oil based on the amount of resin solids present in the latex aqueous emulsion paint. The term "resin solids" as used herein includes polyvinyl acetate. The polyvinyl acetate emulsion employed is desirably an emulsion containing of the order of 55% of solids which are commercially available. Emulsions containing other percentages of solids may be used. As exemplary of such emulsions the following commercially available polyvinyl acetate emulsions are given. One such is "Resyn 12K55" manufactured by National Starch Products, Inc., and having the following composition:

"RESYN 12K55"—TYPICAL PROPERTIES

| | |
|---|---|
| Solids | 55%. |
| Monomer content | Under 0.5%. |
| Weight/gal. | 9.1. |
| Pounds solid/gal. | 5.0. |
| Viscosity | 600 cps. |
| pH | 4.5. |
| Particle charge | Anionic. |
| Mechanical stability | Excellent, stable to high and low speed agitation. |
| Compatibility | Borax compatible. |
| Particle size | 0.2 micron (average). |
| Film properties | Clear, flexible and water resistant. |
| Specific gravity | 1.17. |
| Solvent resistance | Excellent — aliphatic hydrocarbons. Limited—carbon tetrachloride, methanol, acetone, benzene. |
| Water resistance | Excellent. |
| Clarity | Clear. |

Internal plasticization: The comonomer imparts the properties of permanent flexibility and softness to the copolymer film.

Another such composition is "Polyco 804" manufactured by The Borden Company and described as follows:

PROPERTIES OF "POLYCO 804"

| | |
|---|---|
| Solids | 55±0.5%. |
| pH @ 25° C. | 4–5. |
| Viscosity @ 25° C. | 2000±300 cps. |
| Particle size, micron | 0.2–0.4. |
| Free monomer, maximum | 0.5%. |
| Sp. gr. of emul. @ 25° C. | 1.10. |
| Wgt. per U.S. gal. @ 25° C. | 9.17 lbs. |
| Borax stable | Yes. |
| Freeze-thaw stability | Excellent. |
| Water-resistance of film | Excellent. |

In lieu of these commercial products available on the market, other polyvinyl emulsions and solutions particularly using organic solvents such as acetone, ethanol, ethyl acetate-ethanol, methanol, and toluol and mixtures thereof, may be employed particularly when the amount of polyvinyl acetate in such solutions or emulsions is of the order of 55%. In fact, the "Polyco" products sold by the Borden Company include polyvinyl acetate solutions and emulsions in the organic solvents referred to above. Additives of the type usually employed in such commercial products in addition to the polyvinyl acetate and solvents are desirable but not essential.

The following examples illustrate the invention, parts being by metric weight unless otherwise indicated.

A—CONTROL PAINT

| | Parts |
|---|---|
| Water | 365 |
| Advawet | 6 |
| Potassium tripoly phosphate | 1 |
| Foamicide 281–B | 1 |
| Ethylene glycol | 35 |
| Butyl Cellosolve acetate | 5 |
| Titanium dioxide pigment | 225 |
| Calcium carbonate pigment | 100 |
| Silica pigment | 50 |
| Clay pigment | 75 |
| Cellocize WP–4400 | 4.5 |
| Polyvinyl acetate emulsion | 325 |

This latext paint desirably may be formulated by mixing in the way set forth above or as given for Example 1 below. This paint contained no tung oil and was used as a control against which paints containing tung oil were compared to show improved properties.

EXAMPLE No. 1

A latex paint containing tung oil was made using the following formula:

| | Parts |
|---|---|
| Water | 365 |
| Advawet | 6 |
| Potassium tripoly phosphate | 1 |
| Foamicide 281–B | 1 |
| Ethylene glycol | 35 |
| Butyl Cellosolve acetate | 5 |
| Titanium dioxide | 225 |
| Calcium carbonate | 100 |
| Silica | 50 |
| Clay | 75 |
| Cellocize WP–4400 | 4.5 |
| Polyvinyl acetate emulsion | 162 |
| Emulsifiable tung oil | 89 |

The method of compounding the paint may be as follows:

365 parts of water are added to a container and placed under a high speed mechanical dissolver. Any suitable equipment may be used. To the water is added 1 part of potassium poly phosphate as a water softening agent and a buffering agent to control pH of the solution. 89 grams of emulsifiable tung oil was then added to the mix. The emulsifiable tung oil may be prepared by adding 4.6 parts of "Tergitol NPX," 1.0 part of 24% lead naphthenate and 0.4 part of 6% cobalt naphthenate to 83 parts of pure raw tung oil. Next 6 parts of "Advawet" is added to the paint. 415 parts of "Cellocize WP-4400" is next added to adjust viscosity of the mixture.

With continuing agitation, pigments are then added to the mix. 225 parts of titanium dioxide, 100 parts of calcium carbonate, 50 parts of silica and 75 parts of clay are added successively.

These pigments are agitated well to obtain good dispersion. Then 1 part of "Foamicide 281-B" is added to prevent foaming and prevent entrapment of air in the mixture. At this point in the process, after thorough mixing, the paste is passed through a high speed stone mill. After grinding the following ingredients are added: 35 parts of ethylene glycol is then added to protect the mixture against freezing. A commercially available chemically pure grade is used. 5 parts of butyl Cellosolve acetate is added next to assist in leveling and coalescence of the paint. A chemically pure grade is used.

Finally 162 grams of 55% polyvinyl acetate emulsion is added and mixed in carefully. A commercially available emulsion may be used, containing 55% polymerized vinyl acetate dispersed in water with various dispersing and stabilizing agents. For this work a material as manufactured by the National Starch Products Co. under the trade name of "Resyn 12K55" may be used. Similar polyvinyl acetate emulsions manufactured by other companies also perform satisfactorily.

After preparation this paint has the following:

Viscosity _____ K.U__ 88
Pounds/gal. _____ 10.8

Mixtures were then prepared of the paint described in Example 1 with the control paint A in different proportions so that there was a total of nine paints each containing a different amount of tung oil. Table I below lists these different paints and indicates the percent of tung oil contained in each.

*Table I*

| Paint: | Percent tung oil on vehicle, N.V. |
|---|---|
| Control paint | 0 |
| A | 6.25 |
| B | 12.50 |
| C | 18.75 |
| D | 25.00 |
| E | 31.25 |
| F | 37.50 |
| G | 43.75 |
| Example 1 paint | 50 |

Different properties of these paints were compared as described below:

*Brushability, leveling and drying.*—Brushing and leveling were evaluated by operators individually brushing out panels of the paints and rating them as to ease of brushing. Leveling of the brushed out films was also observed and rated. Variations in results between operators were negligible. Drying rates were observed from 3 mil (.003 inch) wet films cast on glass. The conclusions reached from these tests were that the properties of brushability, leveling, and drying were unaffected by varying the amounts of tung oil.

*Effect of tung oil on film hardness.*—A film of each paint was cast on a glass plate at 3 mil (.003 inch) wet film thickness, using a Bird applicator. These films were dried for 24 hours at 78° F. and 70% relative humidity. Sward hardness was measured on each film and a curve plotted relating hardness to tung oil content. (See Graph I.)

*Table II*

HARDNESS DATA

| Paint | Percent Tung Oil | Sward Hardness on Dried Film, Percent |
|---|---|---|
| Control Paint | 0 | 9 |
| A | 6.25 | 9 |
| B | 12.50 | 9 |
| C | 18.75 | 8 |
| D | 25.00 | 8 |
| E | 31.25 | 7.7 |
| F | 37.50 | 7.7 |
| G | 43.75 | 6.6 |
| Example 1 Paint | 50.00 | 6.6 |

Graph I shows that the addition of tung oil plasticizes the film with the greatest effect evident after the first additions. Further additions of tung oil, however, have only a slight additional plasticizing effect on the film. At the level of 50% tung oil and 50% PVAc there is obtained a hardness of 6.6% compared to a 16% hardness for 100% PVAc resin. Hardnesses measured on these films with pencils bear out the Sward hardness data. From these tests it is found that tung oil plasticizes the film of these emulsion paints.

*Effect of tung oil on caustic resistance.*—As vegetable oils have a tendency to saponify when placed in caustic solutions, it was expected that the alkali resistance of the paint films would decrease as the amount of tung oil increased. Whether decrease in alkali resistance would be sufficiently great to be detrimental to the film properties of tung oil-PVA paints was a matter of great concern as such paints must be stable to soaps and detergents used in cleaning. To determine resistance to alkali the following test was used:

*Caustic test.*—Films of each of the test paints were applied to glass plates at a 3 mil (.003 inch) wet film thickness, then dried for 48 hours at 78° F. and 70% relative humidity. Solutions in water of 1%, 5%, 10%, 15%, 20% and 25% NaOH were prepared. Five drops of each concentration of caustic were placed on each film, covered with a watch glass and allowed to stand for 30 minutes. Conditions of the films were then observed and recorded.

As expected, 100% PVA films were unaffected by 25% NaOH solution. Also 6.25% tung oil–73.75% PVA were unaffected by this extremely strong alkali. At levels of 12.50% and 18.75% tung oil only slight blistering was caused by 25% NaOH and at concentration of 18.75% tung oil some discoloration was noted. 25% tung oil films were blistered by 15% NaOH. 31.25% tung oil films were discolored by 15% NaOH. 5% NaOH solutions, which are much stronger than usually encountered by paint in actual use, did not affect these films until a level of 43.75% tung oil was reached.

These data are presented in Chart I. "P" indicates passed and "F" indicates failure.

*Chart I*

| Percent Caustic | 1 | 5 | 10 | 15 | 20 | 25 |
|---|---|---|---|---|---|---|
| Percent Tung Oil: | | | | | | |
| 0 | P | P | P | P | P | P |
| 6-25 | P | P | P | P | P | P |
| Percent Caustic | 1 | 5 | 10 | 15 | 20 | 25 |
| Percent Tung Oil: | | | | | | |
| 12.5 | P | P | P | P | P | F |
| 18.75 | P | P | P | P | F | F |
| 25.00 | P | P | P | F | F | F |
| 31.25 | P | P | F | F | F | F |
| 37.5 | P | P | F | F | F | F |
| 43.75 | P | F | F | F | F | F |

The alkali resistance of paint films are not adversely affected at tung oil levels below 31.25%.

*Effect of tung oil on dry adhesion.*—As adhesion is a difficult quantity to measure, a method was devised to evaluate adhesion by using a reverse impact tester. Films of the paints were applied to aluminum "Q" panels by spraying. Panels were airdried 2 hours, then aged for 24 hours at 220° F. in an electric oven. Reverse impacts of 10, 20, 30, 40 and 50 inch-pounds were run and evaluated by the following ratings.

| Description: | Rating |
|---|---|
| No cracks or breaks in film | 0 |
| Very slight cracks | 1 |
| Slight cracking | 2 |
| Cracking | 3 |
| Cracking and separation of film | 4 |
| Severe cracking and flaking of paint | 5 |

Readings were taken and an adhesion factor was derived by a summation of the rating for the 5 impacts at increasing loadings; thus, the lower the adhesion factor number, the better the adhesion of the film to the substrata. These data for each film were plotted against percent tung oil in the film and shown in Graph II.

Graph II shows that the best adhesion was obtained with high loadings of tung oil. The curve is almost a straight line function. Therefore, the dry adhesion of PVA-tung oil paints is improved as the quantity of tung oil is increased.

*Effect of tung oil on wet adhesion.*—Paints were applied to aluminum "Q" panels by spraying air-dried 2 hours, then aged for 24 hours at 220° F. in an electric oven. Panels were cooled, then immersed in boiling water for 5 minutes and reverse impacts were run immediately after removal from boiling water at 10, 20, 30, 40, 50 and 60 inch-pounds. The indentions made were read by the previously established rating scale and their adhesion factor number was determined. These data were similarly plotted against percent tung oil in the films and shown in Graph III. It was thus shown that the wet adhesion of PVA-tung oil flat wall paints is greatly improved by increasing the increments of tung oil.

What we claim as our invention, is:

1. A coating composition composed essentially of a pigmented synthetic latex aqueous oil-in-water emulsion paint in which up to about 50% of the latex aqueous emulsion component has been replaced by emulsified raw tung toil containing an emulsifying agent of the oil-in-water type to give a coating composition of the oil-in-water type.

2. A coating composition as set forth in claim 1 in which the pigmented synthetic latex aqueous emulsion paint includes resin solids and from 10 to 40% by weight of emulsified tung oil based on the amount of the resin solids.

3. A coating composition as set forth in claim 1 in which the latex is polyvinyl acetate.

4. A coating composition as set forth in claim 3 in which the aqueous emulsion paint includes resin solids and from 10 to 40% by weight of emulsified tung oil based on the amount of the polyvinyl acetate solids.

5. A process of producing coating compositions which consists essentially in agitating together a pigmented synthetic latex aqueous oil-in-water emulsion with emulsified raw tung oil containing an emulsifying agent of the oil-in-water type to give a coating composition of the oil-in-water type.

6. The process of claim 5 in which up to about 50% of the latex aqueous emulsion component has been replaced by emulsified raw tung oil.

7. The process of claim 6 in which the pigmented synthetic latex aqueous emulsion includes resin solids and from 10 to 40% by weight of emulsified tung oil based on the amount of the resin solids.

8. The process of claim 5 in which the latex is polyvinyl acetate.

9. The process of claim 8 in which up to about 50% of the polyvinyl acetate aqueous emulsion component has been replaced by emulsified raw tung oil.

10. The process of claim 9 in which the pigmented synthetic latex aqueous emulsion includes resin solids and from 10 to 40% by weight of emulsified tung oil based on the amount of the resin solids.

11. The process of producing coating compositions which consists essentially in emulsifying raw tung oil in water in the presence of oil-in-water emulsifying and stabilizing agents and incorporating pigments followed by further stabilizing agent and a synthetic latex aqueous oil-in-water emulsion.

12. The process of claim 11 in which the latex is polyvinyl acetate.

13. The process of claim 11 in which the synthetic latex aqueous emulsion includes resin solids and the emulsified raw tung oil constitutes from 10 to 40% by weight of emulsified tung oil based on the amount of the resin solids.

14. The process of claim 13 in which the latex is polyvinyl acetate.

15. A wood article carrying a dried coating of the composition of claim 1.

16. A wood article carrying a dried coating of the composition of claim 4.

17. A masonry article of manufacture carrying a dried coating of the composition of claim 1.

18. A masonry article of manufacture carrying a dried coating of the composition of claim 4.

19. An article of manufacture carrying a dried coating of the composition of claim 1.

20. The method of coating articles of manufacture which comprises applying thereto the composition of claim 1 and drying the coating.

References Cited in the file of this patent
UNITED STATES PATENTS

| 1,938,662 | Lawson | Dec. 12, 1933 |
| 2,324,601 | Spanagel | July 20, 1943 |
| 2,382,533 | Auer | Aug. 14, 1945 |
| 2,402,331 | Kvalnes | June 18, 1946 |
| 2,606,164 | Henson et al. | Aug. 5, 1952 |
| 2,825,707 | Auer | Mar. 4, 1958 |